(12) United States Patent
Jobs et al.

(10) Patent No.: US 8,015,384 B2
(45) Date of Patent: *Sep. 6, 2011

(54) MEMORY HUB ARCHITECTURE HAVING PROGRAMMABLE LANE WIDTHS

(75) Inventors: Jeffrey R. Jobs, Blaine, MN (US); Thomas A. Stenglein, Andover, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/550,989

(22) Filed: Aug. 31, 2009

(65) Prior Publication Data
US 2009/0319750 A1 Dec. 24, 2009

Related U.S. Application Data

(63) Continuation of application No. 12/074,888, filed on Mar. 7, 2008, now Pat. No. 7,596,675, which is a continuation of application No. 10/797,727, filed on Mar. 8, 2004, now Pat. No. 7,366,864.

(51) Int. Cl.
*G06F 12/00* (2006.01)
(52) U.S. Cl. ............... 711/170; 710/300; 710/307
(58) Field of Classification Search ............ 711/170
See application file for complete search history.

(56) References Cited

U.S. PATENT DOCUMENTS

| | | | |
|---|---|---|---|
| 3,777,154 A | 12/1973 | Lindsay | 250/227 |
| 4,443,845 A * | 4/1984 | Hamilton et al. | 710/300 |
| 4,809,232 A | 2/1989 | Baumbaugh et al. | 365/221 |
| 4,813,772 A | 3/1989 | Kowel et al. | 350/388 |
| 4,823,403 A | 4/1989 | Twietmeyer | 455/607 |
| 4,825,208 A | 4/1989 | Mueller et al. | 370/236 |
| 4,953,930 A | 9/1990 | Ramsey et al. | 350/96.11 |
| 5,251,303 A | 10/1993 | Fogg, Jr. et al. | 395/275 |
| 5,307,381 A | 4/1994 | Ahuja | 375/107 |
| 5,327,553 A | 7/1994 | Jewett et al. | 395/575 |

(Continued)

FOREIGN PATENT DOCUMENTS

EP 0849685 A2 6/1998

(Continued)

OTHER PUBLICATIONS

Andrew Tanenbaum, "Structured Computer Organization", 1990, Third Edition, pp. 11-13.*

(Continued)

*Primary Examiner* — Hetul Patel
(74) *Attorney, Agent, or Firm* — Dorsey & Whitney LLP

(57) ABSTRACT

A processor-based system includes a processor coupled to a system controller through a processor bus. The system controller is used to couple at least one input device, at least one output device, and at least one data storage device to the processor. Also coupled to the processor bus is a memory hub controller coupled to a memory hub of at least one memory module having a plurality of memory devices coupled to the memory hub. The memory hub is coupled to the memory hub controller through a downstream bus and an upstream bus. The downstream bus has a width of M bits, and the upstream bus has a width of N bits. Although the sum of M and N is fixed, the individual values of M and N can be adjusted during the operation of the processor-based system to adjust the bandwidths of the downstream bus and the upstream bus.

30 Claims, 2 Drawing Sheets

U.S. PATENT DOCUMENTS

| | | | |
|---|---|---|---|
| 5,379,382 A | 1/1995 | Work et al. ............... 395/275 |
| 5,414,819 A | 5/1995 | Redmond et al. ............. 395/325 |
| 5,423,009 A | 6/1995 | Zhu ............................... 710/307 |
| 5,432,907 A | 7/1995 | Picazo, Jr. et al. ............. 395/200 |
| 5,442,770 A | 8/1995 | Barratt ........................... 395/403 |
| 5,465,229 A | 11/1995 | Bechtolsheim et al. ........ 365/52 |
| 5,493,437 A | 2/1996 | Lebby et al. ................... 359/152 |
| 5,497,476 A | 3/1996 | Oldfield et al. ................ 395/439 |
| 5,502,621 A | 3/1996 | Schumacher et al. ......... 361/760 |
| 5,532,856 A | 7/1996 | Li et al. .......................... 359/118 |
| 5,544,319 A | 8/1996 | Acton et al. ............. 395/200.07 |
| 5,544,345 A | 8/1996 | Carpenter et al. ............. 395/477 |
| 5,568,574 A | 10/1996 | Tanguay, Jr. et al. ........... 385/14 |
| 5,608,264 A | 3/1997 | Gaul ............................... 257/734 |
| 5,623,534 A | 4/1997 | Desai et al. .................... 379/59 |
| 5,659,798 A | 8/1997 | Blumrich et al. ............. 395/846 |
| 5,787,475 A | 7/1998 | Pawlowski ..................... 711/137 |
| 5,808,897 A | 9/1998 | Miller et al. .................... 716/1 |
| 5,818,844 A | 10/1998 | Singh et al. .................... 370/463 |
| 5,818,984 A | 10/1998 | Ahmad et al. .................. 385/14 |
| 5,822,255 A | 10/1998 | Uchida ........................... 365/194 |
| 5,831,467 A | 11/1998 | Leung et al. ................... 327/319 |
| 5,872,944 A | 2/1999 | Goldrian et al. |
| 5,875,352 A | 2/1999 | Gentry et al. .................. 395/843 |
| 5,875,454 A | 2/1999 | Craft et al. ...................... 711/113 |
| 5,987,196 A | 11/1999 | Noble ............................. 385/14 |
| 6,026,098 A | 2/2000 | Kamoi et al. |
| 6,026,226 A | 2/2000 | Heile et al. ..................... 716/12 |
| 6,033,951 A | 3/2000 | Chao ............................... 438/253 |
| 6,061,263 A | 5/2000 | Boaz et al. ..................... 365/51 |
| 6,067,262 A | 5/2000 | Irrinki et al. .................... 365/201 |
| 6,073,190 A | 6/2000 | Rooney .......................... 710/56 |
| 6,078,451 A | 6/2000 | Ioki ................................. 360/51 |
| 6,079,008 A | 6/2000 | Clery, III ....................... 712/11 |
| 6,088,774 A | 7/2000 | Gillingham .................... 711/167 |
| 6,101,151 A | 8/2000 | Watanabe et al. ............. 365/233 |
| 6,105,075 A | 8/2000 | Ghaffari ......................... 710/5 |
| 6,105,088 A | 8/2000 | Pascale et al. ................. 710/100 |
| 6,111,757 A | 8/2000 | Dell et al. ....................... 361/737 |
| 6,131,149 A | 10/2000 | Lu et al. .......................... 711/167 |
| 6,137,709 A | 10/2000 | Boaz et al. ..................... 365/51 |
| 6,144,327 A | 11/2000 | Distinti et al. ................. 341/126 |
| 6,144,587 A | 11/2000 | Yoshida ..................... 365/189.05 |
| 6,167,465 A | 12/2000 | Parvin et al. ................... 710/22 |
| 6,167,486 A | 12/2000 | Lee et al. ........................ 711/120 |
| 6,186,400 B1 | 2/2001 | Dvorkis et al. ........... 235/462.45 |
| 6,201,724 B1 | 3/2001 | Ishizaki et al. ................. 365/49 |
| 6,226,729 B1 | 5/2001 | Stevens et al. ................ 711/171 |
| 6,229,712 B1 | 5/2001 | Munoz-Bustamante et al. ............................. 361/783 |
| 6,229,727 B1 | 5/2001 | Doyle ............................. 365/63 |
| 6,233,376 B1 | 5/2001 | Updegrove ..................... 385/14 |
| 6,243,769 B1 | 6/2001 | Rooney .......................... 710/56 |
| 6,243,831 B1 | 6/2001 | Mustafa et al. ................ 714/24 |
| 6,246,618 B1 | 6/2001 | Yamamoto et al. ............ 365/200 |
| 6,256,253 B1 | 7/2001 | Oberlaender et al. ... 365/230.02 |
| 6,256,692 B1 | 7/2001 | Yoda et al. ..................... 710/104 |
| 6,266,730 B1 | 7/2001 | Perino et al. ................... 710/126 |
| 6,272,609 B1 | 8/2001 | Jeddeloh ........................ 711/169 |
| 6,285,349 B1 | 9/2001 | Smith ............................. 345/147 |
| 6,301,637 B1 | 10/2001 | Krull et al. ..................... 711/112 |
| 6,327,642 B1 | 12/2001 | Lee et al. ........................ 711/120 |
| 6,330,205 B2 | 12/2001 | Shimizu et al. ........... 365/230.06 |
| 6,343,171 B1 | 1/2002 | Yoshimura et al. ............ 385/50 |
| 6,344,664 B1 | 2/2002 | Trezza et al. ................... 257/82 |
| 6,347,055 B1 | 2/2002 | Motomura ................. 365/189.05 |
| 6,349,363 B2 | 2/2002 | Cai et al. ........................ 711/129 |
| 6,356,573 B1 | 3/2002 | Jonsson et al. ................ 372/46 |
| 6,366,375 B1 | 4/2002 | Sakai et al. ..................... 359/115 |
| 6,366,529 B1 | 4/2002 | Williams et al. ............... 365/239 |
| 6,367,074 B1 | 4/2002 | Bates et al. ..................... 717/11 |
| 6,373,777 B1 | 4/2002 | Suzuki ....................... 365/230.03 |
| 6,381,190 B1 | 4/2002 | Shinkai ...................... 365/230.03 |
| 6,392,653 B1 | 5/2002 | Malandain et al. ............ 345/501 |
| 6,405,273 B1 | 6/2002 | Fleck et al. .................... 710/131 |
| 6,421,744 B1 | 7/2002 | Morrison et al. .............. 710/22 |
| 6,434,639 B1 | 8/2002 | Haghighi ....................... 710/39 |
| 6,434,654 B1 | 8/2002 | Story et al. ..................... 710/307 |
| 6,438,668 B1 | 8/2002 | Esfahani et al. ............... 711/165 |
| 6,453,377 B1 | 9/2002 | Farnworth et al. ............ 710/300 |
| 6,457,116 B1 | 9/2002 | Mirsky et al. .................. 712/16 |
| 6,462,978 B2 | 10/2002 | Shibata et al. .................. 365/63 |
| 6,463,059 B1 | 10/2002 | Movshovich et al. ........ 370/389 |
| 6,470,422 B2 | 10/2002 | Cai et al. ........................ 711/129 |
| 6,473,828 B1 | 10/2002 | Matsui ............................ 711/104 |
| 6,477,592 B1 | 11/2002 | Chen et al. ..................... 710/52 |
| 6,477,614 B1 | 11/2002 | Leddige et al. ................. 711/5 |
| 6,477,621 B1 | 11/2002 | Lee et al. ........................ 711/120 |
| 6,493,784 B1 | 12/2002 | Kamimura et al. ............ 710/309 |
| 6,496,909 B1 | 12/2002 | Schimmel ...................... 711/163 |
| 6,502,161 B1 | 12/2002 | Perego et al. ................... 711/5 |
| 6,505,287 B2 | 1/2003 | Uematsu ........................ 711/170 |
| 6,507,899 B1 | 1/2003 | Oberlaender et al. ........ 711/169 |
| 6,523,092 B1 | 2/2003 | Fanning ......................... 711/134 |
| 6,523,093 B1 | 2/2003 | Bogin et al. ................... 711/137 |
| 6,526,498 B1 | 2/2003 | Mirsky et al. .................. 712/11 |
| 6,539,490 B1 | 3/2003 | Forbes et al. .................. 713/401 |
| 6,552,304 B1 | 4/2003 | Hirose et al. ................... 219/216 |
| 6,552,564 B1 | 4/2003 | Forbes et al. .................. 326/30 |
| 6,553,479 B2 | 4/2003 | Mirsky et al. .................. 712/16 |
| 6,567,963 B1 | 5/2003 | Trezza ............................ 716/8 |
| 6,570,429 B1 | 5/2003 | Hellriegel ...................... 327/295 |
| 6,584,543 B2 | 6/2003 | Williams et al. ............... 711/105 |
| 6,587,912 B2 | 7/2003 | Leddige et al. ................. 711/5 |
| 6,590,816 B2 | 7/2003 | Perner ........................... 365/200 |
| 6,594,713 B1 | 7/2003 | Fuoco et al. ................... 710/31 |
| 6,599,031 B2 | 7/2003 | Li ................................... 385/88 |
| 6,622,227 B2 | 9/2003 | Zumkehr et al. .............. 711/167 |
| 6,623,177 B1 | 9/2003 | Chilton .......................... 385/88 |
| 6,631,440 B2 | 10/2003 | Jenne et al. .................... 711/105 |
| 6,636,110 B1 | 10/2003 | Ooishi et al. .................. 327/565 |
| 6,636,957 B2 | 10/2003 | Stevens et al. ................ 711/171 |
| 6,651,139 B1 | 11/2003 | Ozeki et al. .................... 711/118 |
| 6,661,940 B2 | 12/2003 | Kim ............................... 385/15 |
| 6,661,943 B2 | 12/2003 | Li ................................... 385/18 |
| 6,667,895 B2 | 12/2003 | Jang et al. ...................... 365/63 |
| 6,681,292 B2 | 1/2004 | Creta et al. ..................... 711/119 |
| 6,681,301 B1 | 1/2004 | Mehta et al. ................... 711/154 |
| 6,681,341 B1 | 1/2004 | Fredenburg et al. |
| 6,707,726 B2 | 3/2004 | Nishio et al. ............. 365/189.12 |
| 6,711,652 B2 | 3/2004 | Arimilli et al. ................ 711/141 |
| 6,715,018 B2 | 3/2004 | Farnworth et al. ............ 710/300 |
| 6,721,187 B2 | 4/2004 | Hall et al. ....................... 361/760 |
| 6,751,113 B2 | 6/2004 | Bhakta et al. .................. 365/63 |
| 6,751,722 B2 | 6/2004 | Mirsky et al. .................. 712/15 |
| 6,752,539 B2 | 6/2004 | Colgan et al. .................. 385/92 |
| 6,754,117 B2 | 6/2004 | Jeddeloh ........................ 365/201 |
| 6,772,261 B1 | 8/2004 | D'Antonio et al. ............ 710/301 |
| 6,793,408 B2 | 9/2004 | Levy et al. ..................... 385/88 |
| 6,793,411 B2 | 9/2004 | Seifert ............................ 385/92 |
| 6,811,320 B1 | 11/2004 | Abbott ........................... 385/58 |
| 6,816,931 B2 | 11/2004 | Shih ............................... 710/62 |
| 6,821,029 B1 | 11/2004 | Grung et al. ................... 385/92 |
| 6,826,160 B1 * | 11/2004 | Wang et al. .................... 370/329 |
| 6,829,398 B2 | 12/2004 | Ouchi ............................. 385/14 |
| 6,910,812 B2 | 6/2005 | Pommer et al. ................ 385/92 |
| 6,949,406 B2 | 9/2005 | Bosnyak et al. ............... 438/106 |
| 6,950,956 B2 | 9/2005 | Zerbe et al. .................... 713/400 |
| 6,956,996 B2 | 10/2005 | Gordon et al. ................. 385/48 |
| 6,961,259 B2 | 11/2005 | Lee et al. ........................ 365/63 |
| 6,961,834 B2 | 11/2005 | Weber ............................ 711/169 |
| 6,980,042 B2 | 12/2005 | LaBerge ........................ 327/291 |
| 6,980,748 B2 | 12/2005 | Leas ............................... 398/202 |
| 6,982,892 B2 | 1/2006 | Lee et al. ........................ 365/63 |
| 7,000,062 B2 | 2/2006 | Perego et al. ................... 711/5 |
| 7,016,213 B2 | 3/2006 | Reeves et al. .................. 365/63 |
| 7,016,606 B2 | 3/2006 | Cai et al. ........................ 398/27 |
| 7,024,547 B2 | 4/2006 | Kartoz ............................ 713/1 |
| 7,035,212 B1 | 4/2006 | Mittal et al. ................... 370/230 |
| 7,047,351 B2 | 5/2006 | Jeddeloh ........................ 711/5 |
| 7,062,595 B2 | 6/2006 | Lindsay et al. ................ 710/315 |
| 7,102,907 B2 | 9/2006 | Lee et al. ........................ 365/63 |
| 7,106,611 B2 | 9/2006 | Lee et al. ........................ 365/200 |
| 7,106,973 B2 | 9/2006 | Kube et al. ..................... 398/164 |
| 7,120,723 B2 | 10/2006 | Jeddeloh ........................ 710/311 |
| 7,136,953 B1 * | 11/2006 | Bisson et al. .................. 710/307 |

| | | | |
|---|---|---|---|
| 7,171,508 B2 | 1/2007 | Choi | 710/307 |
| 7,174,409 B2 | 2/2007 | Jeddeloh | 710/311 |
| 7,181,584 B2 | 2/2007 | LaBerge | 711/167 |
| 7,200,024 B2 | 4/2007 | Taylor | 365/64 |
| 7,206,887 B2 | 4/2007 | Jeddeloh | 710/311 |
| 7,213,082 B2 | 5/2007 | Jeddeloh | 710/5 |
| 7,216,196 B2 | 5/2007 | Jeddeloh | 711/5 |
| 7,222,210 B2 | 5/2007 | Jeddeloh | 710/311 |
| 7,222,213 B2 | 5/2007 | James | 711/5 |
| 7,234,070 B2 | 6/2007 | James | 713/503 |
| 7,242,213 B2 | 7/2007 | Pax | 326/30 |
| 7,245,145 B2 | 7/2007 | Pax et al. | 326/30 |
| 7,254,331 B2 | 8/2007 | Murphy | 398/70 |
| 7,257,683 B2 | 8/2007 | Jeddeloh | 711/154 |
| 7,266,633 B2 | 9/2007 | James | 711/5 |
| 7,282,947 B2 | 10/2007 | Pax et al. | 326/21 |
| 7,289,347 B2 | 10/2007 | Taylor | 365/64 |
| 7,330,992 B2 | 2/2008 | Jeddeloh | 713/500 |
| 7,392,331 B2 | 6/2008 | James et al. | 710/36 |
| 7,412,571 B2 | 8/2008 | Jeddeloh et al. | |
| 7,584,336 B2 | 9/2009 | Tremaine | |
| 7,793,030 B2 * | 9/2010 | Jenkins et al. | 710/307 |
| 2001/0023474 A1 | 9/2001 | Kyozuka et al. | 711/114 |
| 2001/0034839 A1 | 10/2001 | Karjoth et al. | 713/190 |
| 2001/0039632 A1 | 11/2001 | MacLaren et al. | |
| 2002/0038412 A1 | 3/2002 | Nizar et al. | 711/170 |
| 2002/0112119 A1 | 8/2002 | Halbert et al. | 711/115 |
| 2002/0144064 A1 | 10/2002 | Fanning | 711/144 |
| 2003/0005223 A1 | 1/2003 | Coulson et al. | 711/118 |
| 2003/0043426 A1 | 3/2003 | Baker et al. | 359/109 |
| 2003/0229734 A1 | 12/2003 | Chang et al. | 710/36 |
| 2003/0229770 A1 | 12/2003 | Jeddeloh | 711/213 |
| 2004/0015650 A1 | 1/2004 | Zumkehr et al. | 711/105 |
| 2004/0044833 A1 | 3/2004 | Ryan | 711/5 |
| 2004/0123088 A1 | 6/2004 | Poisner et al. | 713/1 |
| 2004/0126115 A1 | 7/2004 | Levy et al. | 398/116 |
| 2004/0128421 A1 | 7/2004 | Forbes | 710/303 |
| 2004/0144994 A1 | 7/2004 | Lee et al. | 257/200 |
| 2004/0148482 A1 | 7/2004 | Grundy et al. | 711/167 |
| 2004/0230718 A1 | 11/2004 | Polzin et al. | 710/22 |
| 2004/0243769 A1 | 12/2004 | Frame et al. | |
| 2004/0257890 A1 | 12/2004 | Lee et al. | 365/200 |
| 2004/0268009 A1 | 12/2004 | Shin et al. | 710/310 |
| 2005/0105350 A1 | 5/2005 | Zimmerman | 365/201 |
| 2005/0162882 A1 | 7/2005 | Reeves et al. | 365/63 |
| 2005/0177677 A1 | 8/2005 | Jeddeloh | 711/158 |
| 2005/0177690 A1 | 8/2005 | LaBerge | 711/154 |
| 2005/0177695 A1 | 8/2005 | Larson | 711/138 |
| 2005/0210185 A1 | 9/2005 | Renick | 711/105 |
| 2005/0216677 A1 | 9/2005 | Jeddeloh et al. | |
| 2005/0228939 A1 | 10/2005 | Janzen | 711/105 |
| 2005/0257021 A1 | 11/2005 | James | 711/170 |
| 2005/0268060 A1 | 12/2005 | Cronin et al. | 711/167 |
| 2006/0047891 A1 | 3/2006 | James et al. | 711/105 |
| 2006/0179203 A1 | 8/2006 | Jeddeloh | 710/311 |
| 2006/0179208 A1 | 8/2006 | Jeddeloh | 711/100 |
| 2006/0195647 A1 | 8/2006 | Jeddeloh | 711/100 |
| 2006/0200598 A1 | 9/2006 | Janzen | 710/58 |
| 2006/0204247 A1 | 9/2006 | Murphy | 398/139 |
| 2006/0206667 A1 | 9/2006 | Ryan | 711/115 |
| 2006/0206742 A1 | 9/2006 | James | 713/503 |
| 2006/0271720 A1 | 11/2006 | James et al. | 710/306 |
| 2007/0025133 A1 | 2/2007 | Taylor | 365/63 |
| 2007/0035980 A1 | 2/2007 | Taylor | 365/63 |
| 2007/0143553 A1 | 6/2007 | LaBerge | 711/154 |
| 2008/0036492 A1 | 2/2008 | Pax et al. | 326/30 |

FOREIGN PATENT DOCUMENTS

| | | |
|---|---|---|
| GB | 2288066 | 4/1995 |
| JP | 2001265539 A | 9/2001 |

OTHER PUBLICATIONS

'Free On-Line Dictionary of Computing' entry "Flash Erasable Programmable Read-Only Memory," online May 17, 2004 [http://foldoc.doc.ic.ac.uk/foldoc/foldoc.cgi?flash+memory].

Clugston, Mike, "Cache" definition, 2004 [www.xreferplus.com].

Depari et al., "*USB Sensor Network for Industrial Applications*", IEEE Xplore, May 2004 (Abstract Only).

Gillett et al., "*Using the Memory Channel Network*", Micro IEEE, vol. 17, Issue 1, Jan.-Feb. 1997 (Abstract Only).

Gillingham, Peter, SLDRAM Architectural and Functional Overview, 1997 SLDRAM Consortium, Aug. 29, 1997, p. 14.

Gommans et al., "*Applications Drive Secure Lightpath Creation Across Heterogeneous Domains*", Communications Magazine, IEEE, vol. 44, Issue 3, Mar. 2006 (Abstract Only).

Hsieh et al., "*On the Design of a Local Switch for Heterogenous Multi-subsystem Interconnected*", IEEE Xplore, Oct. 1993 (Abstract Only).

Omkar et al., "Neural network controller for minimizing hub shear forces in helicopter" (Abstract Only) Publication Date: Sep. 14-17, 1998.

Scott et al., "*An Overview of the Visualize fx Graphics Hardware*" May 1998, p. 29.

Intel, "Intel 840 Chipset: 82840 Memory Controller Hub (MCH)", Datasheet, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

* cited by examiner

MEMORY HUB ARCHITECTURE HAVING PROGRAMMABLE LANE WIDTHS

CROSS-REFERENCE TO RELATED APPLICATION

This application is a continuation of U.S. patent application Ser. No. 12/074,888 filed Mar. 7, 2008, and issued as U.S. Pat. No. 7,596,675 B2 on Sep. 29, 2009, which is a continuation of U.S. patent application Ser. No. 10/797,727, filed Mar. 8, 2004 and issued as U.S. Pat. No. 7,366,864 B2 on Apr. 29, 2008. These applications and patents are each incorporated by reference herein.

TECHNICAL FIELD

This invention relates to processor-based systems having system memory, and, more particularly, to processor-based systems having memory modules containing a memory hub in which the memory hubs are coupled to the processor through a memory hub controller through a downstream bus and an upstream bus.

BACKGROUND OF THE INVENTION

Processor-based systems, such as computer systems, use memory devices, such as dynamic random access memory ("DRAM") devices, as system memory to store instructions and data that are accessed by a processor. In a typical computer system, the processor communicates with the system memory through a processor bus and a memory controller. The processor issues a memory request, which includes a memory command, such as a read command, and an address designating the location from which data or instructions are to be read or to which data or instructions are to be written. The memory controller uses the command and address to generate appropriate command signals as well as row and column addresses, which are applied to the system memory. In response to the commands and addresses, data is transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase speed at which memory commands, addresses and data can be coupled between processors and memory devices. The relatively slow speed of memory controllers and memory devices limits the data bandwidth between the processor and the memory devices.

One approach to increasing the data bandwidth to and from memory devices is to use multiple memory devices coupled to the processor through a memory hub as shown in FIG. 1. A computer system 100 using a memory hub architecture includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, is typically static random access memory ("SRAM"). Finally, the processor bus 106 is coupled to a system controller 110, which is also sometimes referred to as a bus bridge.

The system controller 110 contains a memory hub controller 128 that is coupled to the processor 104. The memory hub controller 128 is also coupled to several memory modules 130a-n through a bus system 134. Each of the memory modules 130a-n includes a memory hub 140 coupled to several memory devices 148 through command, address and data buses, collectively shown as bus 150. The memory hub 140 efficiently routes memory requests and responses between the controller 128 and the memory devices 148. Computer systems employing this architecture can have a higher bandwidth because the processor 104 can access one memory module 130a-n while another memory module 130a-n is responding to a prior memory access. For example, the processor 104 can output write data to one of the memory modules 130a-n in the system while another memory module 130a-n in the system is preparing to provide read data to the processor 104. The operating efficiency of computer systems using a memory hub architecture can make it more practical to vastly increase data bandwidth of a memory system. A memory hub architecture can also provide greatly increased memory capacity in computer systems.

The system controller 110 also serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

A memory hub architecture can greatly increase the rate at which data can be stored in and retrieved from memory because the point-to-point nature of the bus system 134 allows faster electrical signaling, and because the isolated nature of the DRAMs allows parallel or overlapping activity in several modules. In fact, a memory system using several memory modules each containing a memory hub can collectively transmit and receive data at such a high rate that the bus system 134 can become the "bottleneck" limiting the data bandwidth of the memory system.

One technique that has been used to maximize the data bandwidth of memory systems using a memory hub architecture is to implement the bus system 134 using a high-speed "downstream" bus 154 and an "upstream" bus 156 that is separate from the downstream bus 154. The downstream bus 154 and the upstream bus have the same width, i.e., number of conductors. The high-speed downstream bus 154 couples packets containing a memory command, an address, and write data from the memory hub controller 128 to the memory modules 130 and from the memory modules 130 to memory modules 130 located further away from the memory hub controller 128. The high-speed upstream bus 156 couples a packet containing read data and an identifier from memory modules 130 to the memory hub controller 128 and from the memory modules 130 to memory modules 130 located closer to the memory hub controller 128. The use of two different uni-directional buses has the advantage of eliminating turn around latency and allowing the memory hub controller to simultaneously transmit and receive data.

The data bandwidth of memory systems using a memory hub architecture can also be maximized by using a different type of memory signaling protocol. Rather than using traditional address, data and control buses, the address, data and control bits for each memory request or "transaction" are sent together in a single packet. The packet includes a command header followed by read or write data. The command header includes bits corresponding to a memory command, such as a write or a read command, identifying bits that specify the memory module to which the request is directed, and address bits that specify the address of the memory devices 148 in the specified memory module that is being accessed with the request. The command header may also specify the quantity of read or write data that follows the command header. The use of a packetized memory system allows the memory hub controller 128 to issue a memory request by simply transmitting a packet instead of transmitting a sequence of command, address and, in the case of a write request, write data signals. As a result, the memory hub controller 128 can issue memory requests at a faster rate. Furthermore, a packetized memory system frees the memory hub controller 128 from having to keep track of the processing details of each memory request. Instead, the memory hub controller 128 need only transmit the packet. The memory hub 140 in the memory module 130 to which the memory request is directed then processes the memory request without further interaction with the memory hub controller 128. In the case of a read request, the memory hub 140 transmits a packet back to the memory hub controller 128, either directly or through intervening memory modules 130, that contains the read data as well as identifying bits in a command header identifying the read data. The memory hub controller 128 uses the identifying bits to associate the read data with a specific memory request.

Although the memory hub architecture shown in FIG. 1 can provide a significant increase in the data bandwidth between the processor 104 and the memory devices 148, it nevertheless can provide at less than optimum performance. In particular, the capacity of either the downstream bus 154 or the upstream bus 156 can limit the rate at which packets can be coupled to or from the memory modules 130, thereby limiting data bandwidth. The particular bus 154, 156 that becomes overloaded normally depends on the nature of the memory accesses. Memory writes result in a significantly greater amount of traffic through the downstream bus 154 compared to the traffic through the upstream bus 156. Memory reads still require that packets containing commands and addresses be coupled through the downstream bus 154, but they generally result in significantly more traffic being routed through the upstream bus 156. Therefore, memory accesses primarily consisting of writes tend to overload the downstream bus 154, and memory accesses consisting primarily of reads tend to overload the upstream bus 156. In either case, the result is a reduced data bandwidth between the processor 104 and the memory devices 148.

There is therefore a need for a memory hub architecture that is more able to avoid overloading either the downstream bus or the upstream bus coupled between a memory hub controller and one or more memory hubs.

SUMMARY OF THE INVENTION

A memory system that may be used in a processor-based system includes a memory hub controller coupled to at least one memory module having a memory hub and a plurality of memory devices coupled to the memory hub. Command, address and data signals are coupled from the memory hub controller to the memory hub using a communications path having a first capacity, and data signals are coupled from the memory hub to the memory hub controller using a communications path having a second capacity. Although the sum of the first capacity and the second capacity is a fixed value, the individual values of the first and second capacities are altered during the operation of the memory system, such as while the memory system is being initialized, depending upon the magnitudes of the actual or anticipated signal flow through the communication path. In the event of an increase in the magnitude of the actual or anticipated signal flow from the memory hub controller to the memory hub, the first capacity can be increased and the second capacity can be decreased. In the event of an increase in the magnitude of the actual or anticipated signal flow from the memory hub to the memory hub controller, the second capacity can be increased and the first capacity can be decreased.

DETAILED DESCRIPTION OF THE INVENTION

Figure 1:
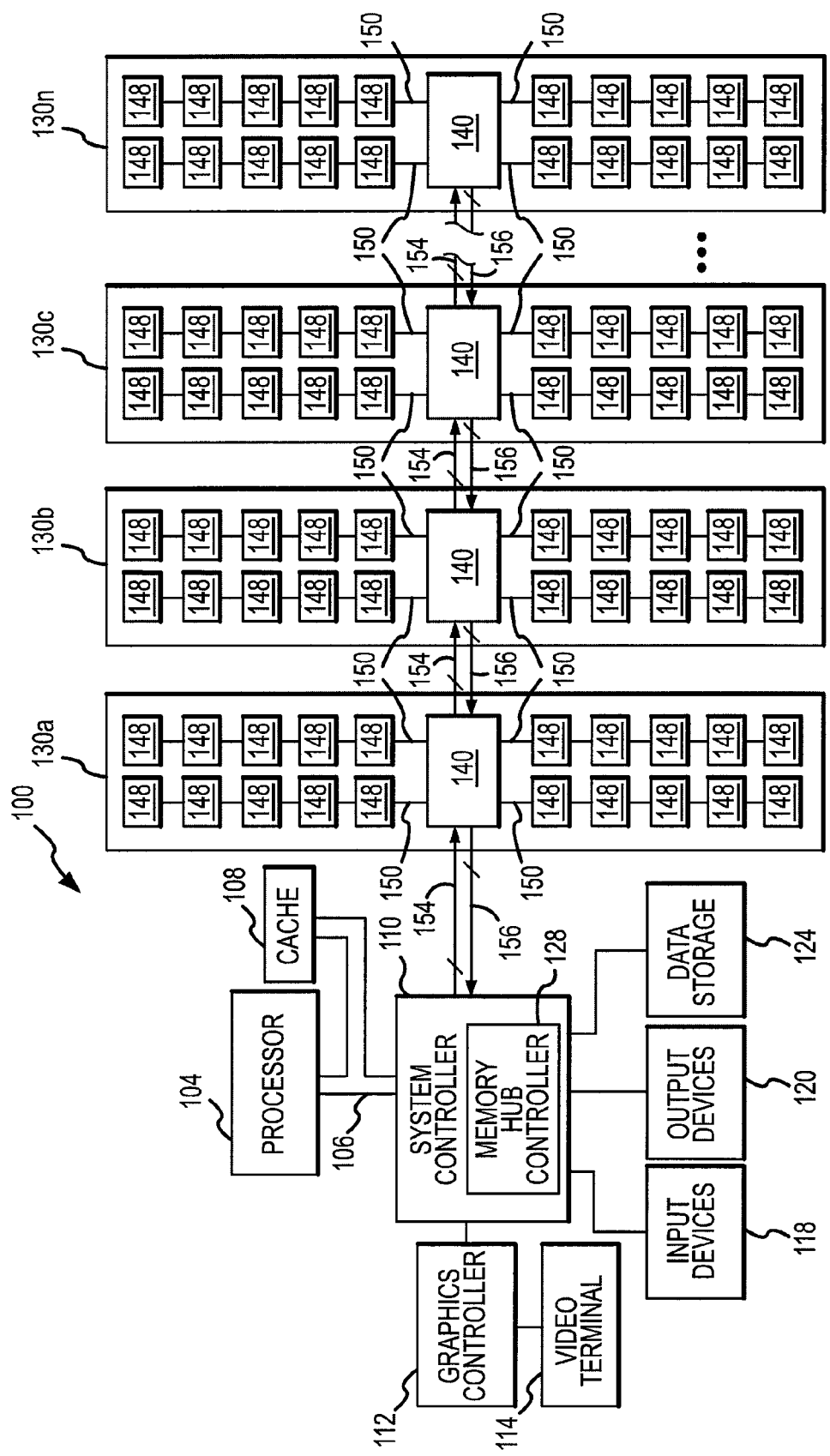
FIG. 1 is a block diagram of a processor-based system having system memory that uses a conventional memory hub architecture.
Figure 2:
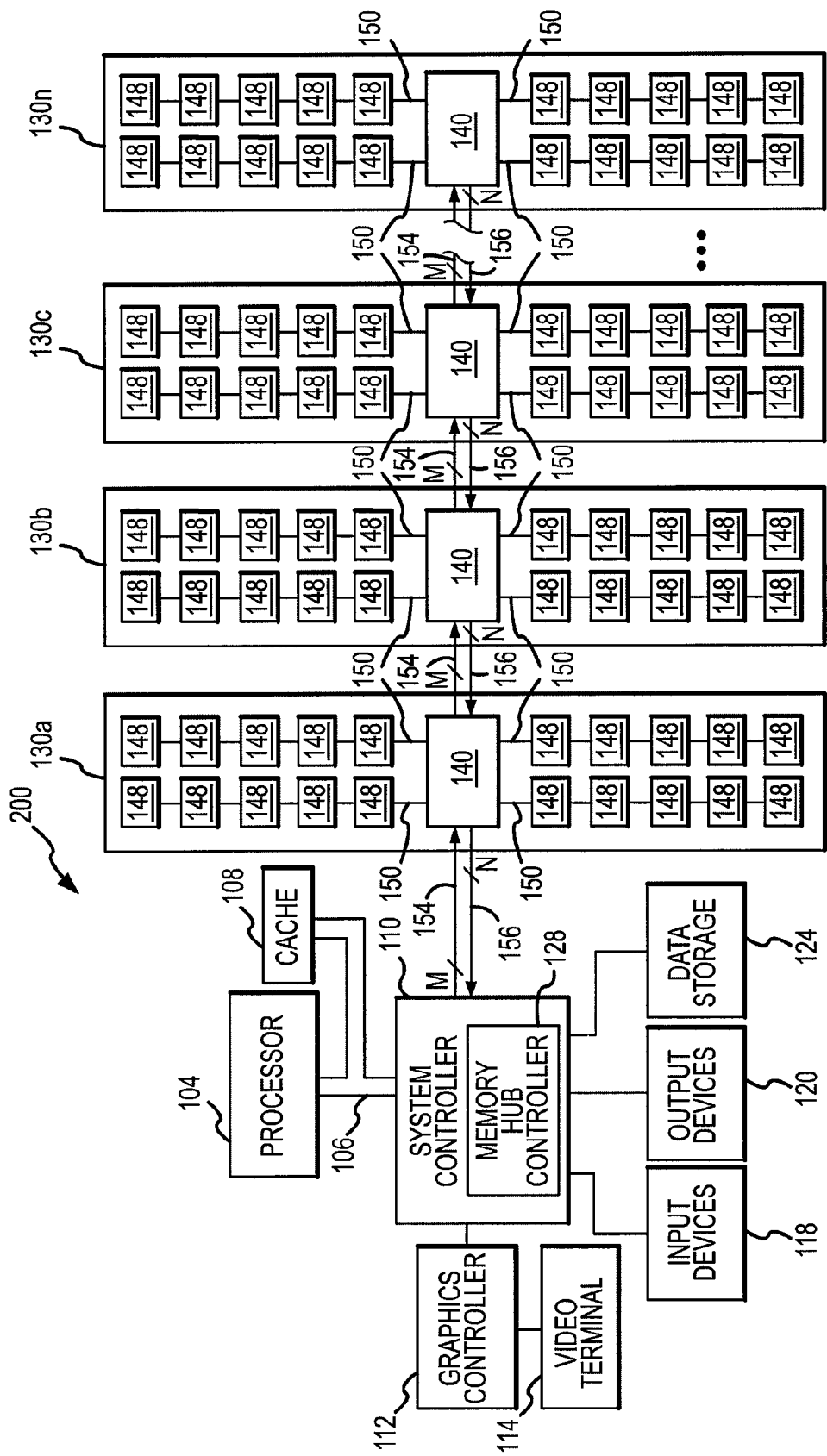
FIG. 2 is a block diagram of a processor-based system having system memory using a memory hub architecture according to one embodiment of the invention.

A processor-based system 200 according to one embodiment of the invention is shown in FIG. 2. The system 200 uses most of the same components used in the system 100 of FIG. 1, and they operate in the same manner. Therefore, in the interest of brevity, they have been provided with the same reference number, and an explanation of their operation will not be repeated. The processor-based system 200 differs from the system 100 shown in FIG. 1 in that the widths of the downstream bus 154 and upstream bus 156 are not fixed, nor are they necessarily equal to each other. Instead, the downstream bus 154 has a width of M bits, and the upstream bus 156 has a width of N bits, where the sum of M and N is equal to a fixed value. The values of M and N are dynamic, preferably depending on the nature of the actual or expected memory accesses. If a disproportionately large number of writes are occurring or expected to occur, the value of M is increased to increase the capacity of the downstream bus 154, and the value of N is decreased accordingly to decrease the capacity of the upstream bus 156. If a disproportionately large number of read are occurring or expected to occur, the value of M is decreased to decrease the capacity of the downstream bus 154, and the value of N is increased accordingly to increase the capacity of the upstream bus 156.

The capacity M of the downstream bus 154 relative to the capacity N of the upstream bus 156 can be determined using a variety of techniques. The system 200 can be manually configured in a semi-permanent manner by manually manipulating hardware jumpers or the like to select the values of M and N. In such case, the values of M and N may be determined during system design based on the anticipated usage of the system 200. However, rather than being static, the values of M and N are preferably dynamic, i.e., they change during the operation of the system 200. The values of M and N may be dynamically changed based on either the actual traffic flow through the buses 154, 156, or the anticipated traffic flow through the buses 154, 156. Alternatively, the values of M and N may be changed at other times during the operation of the memory system, such as when the memory system is being initialized.

If the actual traffic flow is used as the basis for adjusting M and N, the traffic through the buses 154, 156 may be determined by the memory hub controller 128 and the memory hubs 140, which can then adjust M and N by configuring internal buffers coupled to the signals lines in the buses 154, 156 as either input buffers or output buffers. Alternatively, the traffic through the buses 154, 156 may be determined by only the memory hub controller 128, which can couple configuration data to the memory hubs 140. In such case, default values for M and N are used to couple the configuration to the memory hubs 140. The memory hubs 140 can then use the configuration data to configure internal buffers coupled to the signals lines in the buses 154, 156 as either input buffers or output buffers. As an alternative to using hardware to analyze the traffic flow through the buses 154, 156, the actual traffic flow could be determined by software, such as the operation system or run time agents. Other means of determining the actual traffic flow through the buses 154, 156 can also be used.

If anticipated traffic flow through the buses 154, 156 is used as the basis for adjusting M and N, the anticipated traffic flow may be determined by a user and then coupled to the memory hub controller 128 and the memory hubs 140 by suitable means. For example, the anticipated usage information can be coupled through a suitable interface, such as a JTAG interface (not shown) or and I2C interface (not shown). In either case, the memory hub controller 128 and the memory hubs 140 can then configure internal buffers coupled to the signals lines in the buses 154, 156 accordingly.

The anticipated traffic flow through the buses 154, 156 may be either determined directly by a user, as explained above, or it may be inferred from other information. The anticipated traffic flow the buses 154, 156 may be determined based on either the type of hardware included in the system 200 or the software being executed by the processor 104. For example, the processor 104 may determine the appropriate values of M and N and couple these values to the memory hub controller 128 and the memory hubs 140 based on the type of application program executed by the processor 104. There are normally a large number of write accesses when an installation program is being executed. In such case, the processor 104 would increase the value of M and decrease the value of N. A graphics intensive application program, on the other hand, normally requires a disproportionate number of read accesses, so the value of M would be decreased and the value of N would be increased. A communications program normally has about an equal number of reads and writes, so the value of M would be set equal to the value of N. Other hardware or software means for determining the expected traffic flow through the buses 154, 156 can alternatively be used.

Although all of the signal lines in the buses 154, 156 may be configurable as bi-directional so that they can be either part of the downstream bus 154 or part of the upstream bus 156, some of the lines in the buses 154, 156 corresponding in number to minimum values of M and N may be uni-directional and thus dedicated to either the downstream bus 154 or the upstream bus 156. The requirement that the input of an input buffer be coupled to each line that is also coupled to the output of an output buffer may have a tendency in some cases to overload the line. However, this potential problem can be alleviated by equalization techniques or by decoupling the input buffers from the lines of the buses 154, 156 when they are not in use, for example. The manner in which input and output buffers should be coupled to the buses 154, 156, as well as the specific hardware and software than can be used to determine the values of M and N, will be readily apparent to one skilled in the art.

From the foregoing it will be appreciated that, although specific embodiments of the invention have been described herein for purposes of illustration, it will be understood by one skilled in the art that various modifications may be made without deviating from the spirit and scope of the invention. For example, although the memory modules are shown as being physically separate from the memory hub controller, it will be understood that they need not be physically separate. Instead, the memory hub controller and the memory modules may be mounted on a common substrate, such as a motherboard. Accordingly, the invention is not limited except as by the appended claims.

What is claimed is:

1. A memory apparatus comprising:
a memory hub;
at least one memory device coupled to the memory hub;
an upstream bus coupled to the memory hub and configured to have a width having a value of M bits; and
a downstream bus coupled to the memory hub and configured to have a width having a value of N bits, a sum of the values of M and N being equal to a fixed value, and the values of M and N being variable.

2. The memory apparatus of claim 1, wherein the values of M and N are dynamic.

3. The memory apparatus of claim 2, wherein the values of M and N depend on actual memory accesses being issued to the memory.

4. The memory apparatus of claim 2, wherein the values of M and N depend on memory accesses expected to be issued to the memory.

5. The memory apparatus of claim 1, wherein the values of M and N are manually configurable.

6. The memory apparatus of claim 1, wherein the values of M and N are dynamically changeable based on an actual traffic flow through the upstream and the downstream busses.

7. The memory apparatus of claim 6, wherein the actual traffic flow is determined by a controller coupled to the upstream and downstream busses.

8. The memory apparatus of claim 1, wherein the values of M and N are dynamically changeable based on anticipated traffic flow through at least one of the upstream or the downstream busses.

9. The memory apparatus of claim 8, wherein the anticipated traffic flow is determinable by a user.

10. The memory apparatus of claim 8, further comprising an interface configured to receive the anticipated traffic flow.

11. The memory apparatus of claim 10, wherein the interface comprises a JTAG interface.

12. The memory apparatus of claim 8, wherein the anticipated traffic flow is determined based on a type of hardware used in a system comprising the memory.

13. The memory apparatus of claim 8, wherein the anticipated traffic flow is determined based on software being executed by a processor in a system comprising the memory.

14. The memory apparatus of claim 1, wherein the memory hub is configured to receive the values of M and N, wherein the values of M and N are based on a type of application program being executed by a processor in a system including the memory.

15. The memory apparatus of claim 1, wherein the values of M and N are changeable when the memory is being initialized.

16. The memory apparatus of claim 1, wherein the memory hub comprises a plurality of buffers and the upstream bus and the downstream bus each comprise a plurality of signal lines, each signal line configured to be selectively coupled to a respective buffer in the memory hub.

17. The memory apparatus of claim 16, wherein the memory hub is configured to adjust the values of M and N by configuring at least some of the plurality buffers as either input buffers or output buffers.

18. The memory apparatus of claim 16, wherein at least some of the plurality of buffers are decoupled from the respective signal lines when the respective signal line is not in use.

19. The memory apparatus of claim 16, wherein the plurality of signal lines in the upstream and downstream busses are configurable as bi-directional, and each of the plurality of signal lines can be configured to be part of the downstream bus or part of the upstream bus.

20. The memory apparatus of claim 19, wherein some of the signal lines of the downstream bus are unidirectional and dedicated to the downstream bus.

21. The memory apparatus of claim 19, wherein some of the signal lines of the upstream bus are unidirectional and dedicated to the upstream bus.

22. A memory apparatus comprising:
at least one memory device;
a memory hub coupled to the memory device;
an upstream bus coupled to the memory hub and configured to have a width having a value of M bits; and
a downstream bus coupled to the memory hub and configured to have a width with a value of N bits, the value of M bits and the value of N bits being variable based, at least in part, on the number of reads and writes issued to the memory.

23. The memory apparatus of claim 22, wherein the memory accesses issued to the memory comprises actual memory accesses issued to the memory or expected memory accesses to be issued to the memory.

24. The memory apparatus of claim 22, wherein the sum of the values of M and N are equal to a fixed value.

25. The memory apparatus of claim 22, wherein the actual or expected memory access issued to the memory comprise actual or expected traffic flow to at least one of the upstream or the downstream busses.

26. The memory apparatus of claim 22, wherein the value of M bits and the value of N bits are variable in response to expected memory accesses to be issued to the memory and are configured to be set when the memory is initialized.

27. A memory apparatus comprising:
at least one memory device;
a memory hub coupled to the memory device, the memory hub including a plurality of buffers, each buffer being selectively configurable as an input buffer and an output buffer;
an upstream bus having a width of M number of bits and including M number of signal lines coupled to respective buffers in the memory hub configured as an input buffer; and
a downstream bus having a width of N number of bits and including N number of signal lines coupled to respective buffers in the memory hub configured as an output buffer, the width of the N number of bits different than the width of the M number of bits.

28. The memory apparatus of claim 27, wherein the number of buffers configured as input buffers and the number of buffers configured as output buffers are determined based on a number of write requests issued to the memory compared to a number of read request issued to the memory.

29. The memory apparatus of claim 28, wherein the number of buffers configured as output buffers is greater than the number of buffers configured as input buffers when a greater number of read requests are issued to the memory.

30. The memory apparatus of claim 27, wherein the number of buffers configured as output buffers and the number of buffers configured as input buffers is determined based on an expected number of memory requests to be issued to the memory.

* * * * *